(12) United States Patent
Lee et al.

(10) Patent No.: US 12,118,356 B1
(45) Date of Patent: Oct. 15, 2024

(54) MULTI-THREADING PROCESSOR AND OPERATING METHOD THEREOF

(71) Applicant: MetisX CO., Ltd., Yongin-si (KR)

(72) Inventors: Kwang Sun Lee, Yongin-si (KR); Do Hun Kim, Yongin-si (KR); Kee Bum Shin, Yongin-si (KR)

(73) Assignee: MetisX CO., Ltd., Yongin-si (KR)

( * ) Notice: Subject to any disclaimer, the term of this patent is extended or adjusted under 35 U.S.C. 154(b) by 0 days.

(21) Appl. No.: 18/643,178

(22) Filed: Apr. 23, 2024

(30) Foreign Application Priority Data

Jul. 18, 2023 (KR) ........................ 10-2023-0093165

(51) Int. Cl.
*G06F 9/30* (2018.01)
*G06F 9/38* (2018.01)

(52) U.S. Cl.
CPC ........ *G06F 9/3009* (2013.01); *G06F 9/30047* (2013.01); *G06F 9/30145* (2013.01); *G06F 9/38* (2013.01)

(58) Field of Classification Search
None
See application file for complete search history.

(56) References Cited

U.S. PATENT DOCUMENTS

| | | | | |
|---|---|---|---|---|
| 7,509,484 B1 * | 3/2009 | Golla | ................... | G06F 9/3867 712/225 |
| 7,594,079 B2 * | 9/2009 | Yu | ..................... | G06F 12/0862 711/128 |
| 7,822,950 B1 | 10/2010 | Fotland | | |
| 7,890,734 B2 * | 2/2011 | Golla | ................... | G06F 9/3861 712/214 |
| 8,225,034 B1 * | 7/2012 | Golla | ................... | G06F 9/3814 711/109 |
| 8,335,911 B2 * | 12/2012 | Golla | ................... | G06F 9/3851 712/220 |
| 8,347,309 B2 * | 1/2013 | Smolens | ............... | G06F 9/5016 712/214 |
| 8,769,246 B2 * | 7/2014 | Golla | ................... | G06F 9/3888 712/215 |
| 9,058,180 B2 * | 6/2015 | Golla | ................... | G06F 9/3851 |
| 9,092,343 B2 * | 7/2015 | Yu | ..................... | G06F 12/0862 |

(Continued)

FOREIGN PATENT DOCUMENTS

KR 10-2006-0111660 A 10/2006
WO 2005/066779 A1 7/2005

OTHER PUBLICATIONS

'Multi-Threaded Processor Design for Embedded Systems' by Ran Zhang et al., Apr. 2013. (Year: 2013).*

(Continued)

*Primary Examiner* — Steven G Snyder
(74) *Attorney, Agent, or Firm* — Studebaker & Brackett PC

(57) ABSTRACT

A multi-threading processor is provided, which includes a cache including a memory and a controller, and a core electrically connected to the cache and configured to simultaneously execute and manage a plurality of threads, in which the core is configured to determine an occurrence of a data hazard for the plurality of threads and stall operations of the plurality of threads, receive, from the cache, hint information instructing a first thread of the plurality of threads to operate, and initiate an operation of the first thread based on the hint information while the data hazard for the plurality of threads is maintained.

14 Claims, 7 Drawing Sheets

(56) References Cited

U.S. PATENT DOCUMENTS

| | | | | |
|---|---|---|---|---|
| 9,262,171 | B2* | 2/2016 | Golla | G06F 9/3842 |
| 9,286,075 | B2* | 3/2016 | Smittle | G06F 9/3842 |
| 9,436,501 | B2* | 9/2016 | Cain, III | G06F 12/0891 |
| 9,442,734 | B2* | 9/2016 | Gonion | G06F 9/3824 |
| 9,448,835 | B2* | 9/2016 | Cain, III | G06F 12/0875 |
| 9,524,164 | B2* | 12/2016 | Olson | G06F 9/3838 |
| 9,632,775 | B2* | 4/2017 | Gonion | G06F 9/30043 |
| 9,632,939 | B2* | 4/2017 | Yu | G06F 12/0862 |
| 9,766,937 | B2* | 9/2017 | Cain, III | G06F 12/0862 |
| 10,430,340 | B2* | 10/2019 | Yu | G06F 12/0862 |
| 11,372,647 | B2* | 6/2022 | Mukherjee | H04L 9/0631 |
| 11,886,882 | B2* | 1/2024 | Mukherjee | H04L 9/0631 |
| 2006/0004989 | A1* | 1/2006 | Golla | G06F 9/3851 |
| | | | | 712/214 |
| 2008/0082721 | A1* | 4/2008 | Yu | G06F 12/0864 |
| | | | | 711/3 |
| 2010/0011166 | A1* | 1/2010 | Yu | G06F 12/0862 |
| | | | | 711/E12.001 |
| 2011/0138153 | A1* | 6/2011 | Golla | G06F 9/3861 |
| | | | | 712/215 |
| 2015/0067305 | A1* | 3/2015 | Olson | G06F 9/3838 |
| | | | | 712/225 |
| 2015/0227368 | A1* | 8/2015 | Gonion | G06F 9/3836 |
| | | | | 712/7 |
| 2015/0227369 | A1* | 8/2015 | Gonion | G06F 9/3838 |
| | | | | 712/7 |
| 2015/0293853 | A1* | 10/2015 | Yu | G06F 12/0862 |
| | | | | 711/137 |
| 2016/0062791 | A1* | 3/2016 | Cain, III | G06F 12/0891 |
| | | | | 711/136 |
| 2016/0062899 | A1* | 3/2016 | Cain, III | G06F 9/4843 |
| | | | | 711/125 |
| 2016/0364270 | A1* | 12/2016 | Cain, III | G06F 9/5016 |
| 2017/0192894 | A1* | 7/2017 | Yu | G06F 12/0864 |
| 2021/0173657 | A1* | 6/2021 | Mukherjee | G06F 9/3851 |
| 2022/0206945 | A1* | 6/2022 | Beckmann | G06F 12/0862 |
| 2022/0229667 | A1* | 7/2022 | Mukherjee | H04L 9/0631 |

OTHER PUBLICATIONS

'ECE 552 / CPS 550 Advanced Computer Architecture I—Lecture 16 Multi-threading' by Benjamin Lee, Fall 2012. (Year: 2012).*

'Latency Tolerance through Multithreading in Large-Scale Multi-processors' by Kiyoshi Kurihara, In Proceedings International Symposium on Shared Memory Multiprocessing, 1990. (Year: 1990).*

"Request for the Submission of an Opinion" Office Action issued in KR 10-2023-0093165; mailed by the Korean Intellectual Property Office on Oct. 5, 2023.

"Written Decision on Registration" Office Action issued in KR 10-2023-0093165; mailed by the Korean Intellectual Property Office on Feb. 1, 2024.

* cited by examiner

MULTI-THREADING PROCESSOR AND OPERATING METHOD THEREOF

CROSS-REFERENCE TO RELATED APPLICATION

This application claims priority under 35 U.S.C. § 119 to Korean Patent Application No. 10-2023-0093165, filed in the Korean Intellectual Property Office on Jul. 18, 2023, the entire contents of which are hereby incorporated by reference.

BACKGROUND

Technical Field

The present disclosure relates to a multi-threading processor and an operating method thereof.

Description of the Related Art

Data hazard may occur due to data dependency between instructions in a processor. Data dependency may refer to when one instruction has to be executed depending on the result of another instruction. Due to this data dependency, instructions may not be executed sequentially as expected, and restrictions on the order of execution may occur.

Data hazards can be typically classified into three types. Read After Write (RAW) hazard may occur when one instruction needs to read the results of another instruction. Write After Read (WAR) hazard may occur when one instruction writes the data that another instruction needs to read first. Write After Write (WAW) hazard may occur when two instructions write values on the same data. When data hazards occur, performance degradation and erroneous results may be caused to the processor.

If the data hazard occurs in a multi-threading processor, the thread cannot operate until the hazard state is resolved. In this case, if there is an operable thread among the other threads, that operable thread is operated. However, if data hazard occurs frequently due to long latency such as memory access, all threads may be inoperable due to the data hazard. In this case, there is a disadvantage that performance damage occurs because the execution unit cannot operate.

In addition, when switching threads for reasons such as data hazard, if other threads are also in the data hazard state, it is not possible to switch the threads. In this case, performance damage occurs to the processor. That is, as the data hazard state continues, the performance is further damaged. In particular, performance damage often occurs if data hazard is not resolved during long latency due to memory access or the like. Even if data is transferred quickly using data cache, etc. to reduce the time in data hazard state, additional time is needed until the data hazard is resolved inside the processor, which makes performance damage insurmountable.

SUMMARY

In order to solve one or more problems (e.g., the problems described above and/or other problems not explicitly described herein), a technical object of the present disclosure is to provide a mechanism for optimizing the performance of a core.

A technical object of the present disclosure is to provide an efficient operation mechanism that minimizes the performance damage of the core in a data hazard state.

The present disclosure may be implemented in various ways including an apparatus, a system, a method, or a computer program stored in a readable storage medium.

In an aspect of the present disclosure, a multi-threading processor is disclosed. The processor may include a cache including a memory and a controller, and a core electrically connected to the cache and configured to simultaneously execute and manage a plurality of threads, in which the core may be configured to determine an occurrence of a data hazard for the plurality of threads and stall operations of the plurality of threads, receive, from the cache, hint information instructing a first thread of the plurality of threads to operate, and initiate an operation of the first thread based on the hint information while the data hazard for the plurality of threads is maintained.

According to another aspect of the present disclosure, an operating method of a multi-threading processor including a cache including a memory and a controller, and a core electrically connected to the cache and configured to simultaneously execute and manage a plurality of threads is disclosed. The method may include determine an occurrence of a data hazard for the plurality of threads and stall operations of the plurality of threads, receiving, from the cache, hint information instructing a first thread of the plurality of threads to operate, and initiate an operation of the first thread based on the hint information while the data hazard for the plurality of threads is maintained.

According to various examples of the present disclosure, it is possible to provide a multi-threading process with optimized core performance and an operating method thereof.

According to various examples of the present disclosure, it is possible to efficiently operate a multi-threading process by minimizing performance loss of the core in the data hazard state.

According to various examples of the present disclosure, while the data hazard is maintained, it is possible to calculate an expected time point when the data hazard will be resolved and perform a pre-pipeline operation until the expected time point, thereby improving the performance of the processor.

The effects of the present disclosure are not limited to the effects described above, and other effects not described herein can be clearly understood by those of ordinary skill in the art (hereinafter referred to as "ordinary technician") from the description of the claims.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

Figure 1:
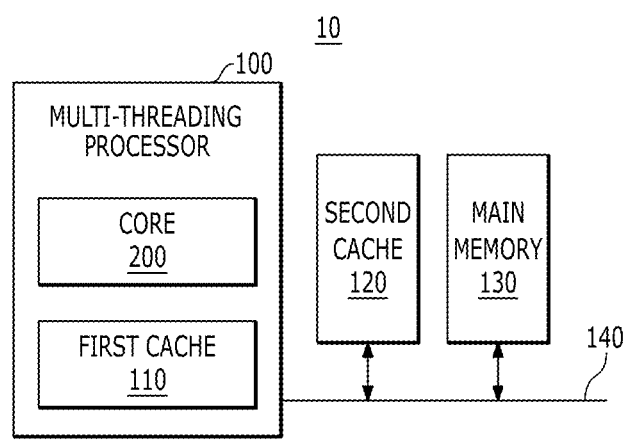
FIG. 1 is a schematic diagram illustrating a multi-threading system.

Various embodiments set forth herein are illustrated for the purpose of clearly describing the technical ideas of the present disclosure, and are not intended to be limited to particular embodiments. The technical ideas of the present disclosure include various modifications, equivalents, and alternatives of each embodiment set forth herein, and embodiments obtained by selectively combining all or part of each embodiment. In addition, the scope of the technical ideas of the present disclosure is not limited to various embodiments or specific descriptions thereof presented below.

Terms used herein, including technical or scientific terms, may have the meaning commonly understood by those of ordinary skill in the art to which the present disclosure pertains unless defined otherwise.

As used herein, expressions such as "include(s)," "may include," "is/are provided with", "may be provided with," "have/has," "can have," and the like mean that target features (e.g., functions, operations, components, or the like) exist, and do not preclude the presence of other additional features. That is, such expressions should be understood as open-ended terms that imply the possibility of including other embodiments.

Singular expressions herein include plural expressions unless the context clearly dictates that they are singular. Further, plural expressions include singular expressions unless the context clearly dictates that they are plural. Throughout the specification, when a part is said to include a component, this means that it may further include other components rather than excluding other components unless particularly described to the contrary.

Further, the term 'module' or 'part' used herein refers to a software or hardware component, and the 'module' or 'part' performs certain roles. However, the 'module' or 'part' is not meant to be limited to software or hardware. The 'module' or 'part' may be configured to reside on an addressable storage medium or may be configured to run one or more processors. Therefore, as one example, the 'module' or 'part' may include at least one of components such as software components, object-oriented software components, class components, and task components, processes, functions, properties, procedures, subroutines, segments of program code, drivers, firmware, microcode, circuitry, data, databases, data structures, tables, arrays, or variables. Functions provided within the components and the 'modules' or 'parts' may be combined into a smaller number of components and 'modules' or 'parts,' or may be further separated into additional components and 'modules' or 'parts.'

According to one embodiment of the present disclosure, a 'module' or 'part' may be implemented with a processor and a memory. The 'processor' should be interpreted broadly so as to encompass general-purpose processors, central processing units (CPUs), microprocessors, digital signal processors (DSPs), controllers, microcontrollers, state machines, and the like. In some circumstances, the 'processor' may also refer to an application-specific integrated circuit (ASIC), a programmable logic device (PLD), a field programmable gate array (FPGA), or the like. The 'processor' may also refer to, for example, a combination of processing devices, such as a combination of a DSP and a microprocessor, a combination of a plurality of microprocessors, a combination of one or more microprocessors combined with a DSP core, or a combination of any other such components. In addition, the 'memory' should be interpreted broadly so as to encompass any electronic component capable of storing electronic information. The 'memory' may also refer to various types of processor-readable media, such as random-access memory (RAM), read-only memory (ROM), non-volatile random-access memory (NVRAM), programmable read-only memory (PROM), erasable-programmable read-only memory (EPROM), electrically erasable PROM (EEPROM), flash memory, magnetic or optical data storage, registers, etc. A memory is said to be in electronic communication with a processor if the processor can read information from and/or write information to the memory. A memory integrated with a processor is in electronic communication with the processor.

As used herein, expressions such as "first" and "second" are used to distinguish one object from another when referring to a plurality of objects of the same kind unless the context indicates otherwise, and do not limit the order or importance among the relevant objects.

As used herein, expressions such as "A, B, and C," "A, B, or C," "A, B, and/or C," or "at least one of A, B, and C," "at least one of A, B, or C one," "at least one of A, B, and/or C," "at least one selected from A, B, and C," "at least one selected from A, B, or C," and "at least one selected from A, B, and/or C" may mean all possible combinations of each listed item or listed items. For example, "at least one selected from A and B" may refer to all of (1) A, (2) at least one of A's, (3) B, (4) at least one of B's, (5) at least one of A's and at least one of B's, (6) at least one of A's and B, (7) at least one of B's and A, (8) A and B.

As used herein, the expression "based on" is used to describe one or more factors that affect the action or operation of a decision or determination described in the phrase or sentence including the expression, and this expression does not preclude additional factors that affect the action or operation of that decision or determination.

As used herein, the expression that a component (e.g., a first component) is "connected" or "coupled" to another component (e.g., a second component) may mean that said component is connected or coupled to said another component directly, as well as connected or coupled via yet another component (e.g., a third component).

As used herein, the expression "configured to" may have the meaning of "set to," "having the ability to," "modified to," "made to," "capable of," etc., depending on the context. The expression is not limited to the meaning of "designed specifically in hardware," and for example, a processor configured to perform a particular operation may refer to a generic-purpose processor capable of performing that particular operation by executing software.

Hereinafter, various embodiments of the present disclosure will be described with reference to the accompanying drawings. In the accompanying drawings and description of the drawings, identical or substantially equivalent components may be given the same reference numerals. Further, in the description of various embodiments below, repetitive descriptions of the same or corresponding components may be omitted, which, however, does not mean that such components are not included in that embodiment.

FIG. 1 is a schematic diagram illustrating a multi-threading system 10.

The multi-threading system 10 may be related to a server, a user terminal, a personal computer, a portable computer, etc. The multi-threading system 10 may include at least one multi-threading processor 100. The multi-threading processor 100 may be an x86 CPU, an ARM, a RISC-V, etc. In addition, the multi-threading processor 100 may be a domain specific architecture (DSA) processor designed to drive a specific application more efficiently. Although FIG. 1 illustrates that the multi-threading system 10 includes one multi-threading processor 100, the multi-threading system 10 is not limited thereto and may include two or more multi-threading processors 100.

The multi-threading system 10 may include the multi-threading processor 100 including a core 200 and a first cache 110. The multi-threading processor 100 may be a processor configured to execute a plurality of threads in parallel. The thread may include a sequence or stream of program instructions. The thread may also be referred to as an execution thread or instruction stream. A plurality of threads may be derived from different programs running in the multi-threading processor 100, from different parts of the same program running in the multi-threading processor 100, or by a combination thereof.

The core 200 may be electrically connected to a cache (e.g., the first cache 110) and configured to simultaneously execute and manage a plurality of threads. The core 200 executes several threads at the same time, and when one thread is stalled, another thread fills the empty moment. For example, when one thread refers to a memory, if a miss occurs in the first cache 110, it is necessary to wait a predetermined time until the requested word is loaded from a second cache 120 or a main memory 130 to the first cache 110. In this case, the core 200 may cause another thread to process another instruction in the meantime.

In the core 200 of the multi-threading processor 100, each thread has a different program counter value. The program counter is a register that points to the memory address of the currently executing instruction. Since each thread is independently executed in the core 200, each thread maintains its own program counter value. This may mean that different threads may be executed along different instruction sequences.

The multi-threading system 10 may include various types of memories. As shown in FIG. 1, the multi-threading system 10 may include the first cache 110 located inside the multi-threading processor 100, the second cache 120 located outside the multi-threading processor 100, and the main memory 130. Each of the first cache 110 and the second cache 120 may include a memory and a controller. The first cache 110 may have the multi-threading processor 100 as its own first-level private cache, and may be a memory that is only responsive to activities of the multi-threading processor 100. On the other hand, the second cache 120 may be at a different level from the first cache 110 and may correspond to a plurality of multi-threading processors. The main memory 130 may store instructions and data accessed by one or more processors including the multi-threading processor 100. The main memory 130 may be a DIMM type DRAM, for example.

The multi-threading system 10 may include a bus 140. The bus 140 may provide a communication function between components of the multi-threading system 10. The bus 140 may be implemented as various types of buses such as an address bus, a data bus, a control bus, etc.

Figure 2:
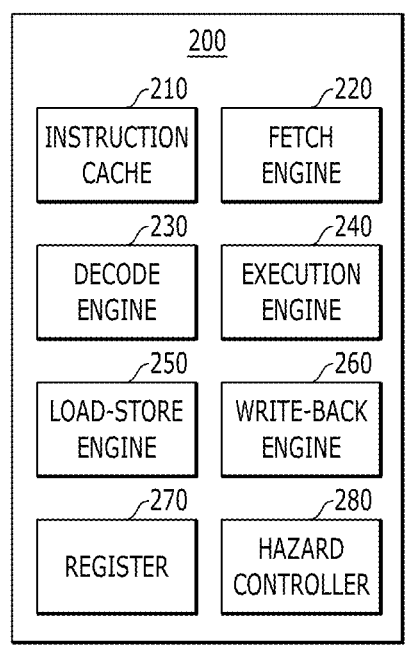
FIG. 2 is a block diagram illustrating a configuration of a core.

FIG. 2 is a block diagram showing a configuration of the core 200.

As shown in FIG. 2, the core 200 may include an instruction cache 210, a fetch engine 220, a decode engine 230, an execution engine 240, a load-store engine 250, a write-back engine 260, a register 270, and a hazard controller 280. The instruction cache 210 may cache the program instructions fetched from the system memory of the multi-threading system 10. The fetch engine 220 may fetch an instruction from the instruction cache 210. The fetch engine 220 may fetch instructions of a plurality of threads based on a program counter value of each of the plurality of threads. The register 270 may store instruction operators provided to the decode engine 230 and the execution engine 240 that execute an instruction. The decode engine 230 may decode the instruction and determine how the instruction is transferred or processed by the multi-threading system 10.

The execution engine 240 may be configured to perform a plurality of mathematical operations on data and generate an operation result. To this end, the execution engine 240 may include arithmetic logic units, integer execution units, floating point execution units, SIMD execution units, and branch execution units. If the instruction decoded by the decode engine 230 is transferred to the execution engine 240, the execution engine 240 may determine which of the mathematical operations is to be performed on the data. Some mathematical operations may require two or more operands. In this case, any additional operands may be preloaded into the register 270, and the execution engine 240 may access the register 270.

The load-store engine 250 may load data from the memory (e.g., the first cache 110) and store the data back in the memory. In addition, the load-store engine 250 may store data in the register (e.g., the register 270) inside the multi-threading system 10. Each of the plurality of threads includes only its own register file, and each register file may include only its own program counter, general-purpose register set, and thread control registers.

The write-back engine 260 may write-back the instruction processing result to the register 270. The execution engine 240 may transfer the operation result to the write-back engine 260. The write-back engine 260 may rewrite the operation result to the memory or the register 270. According to various examples, the load-store engine 250 and/or the write-back engine 260 may be integrated with the execution engine 240.

The core 200 may be a multi-threading scalar core. That is, the core 200 may be a scalar core including one fetch engine 220, one decode engine 230, and one execution engine 240. In this case, the core 200 may issue only one instruction every clock cycle for execution. However, the core 200 is not limited thereto, and it may be a superscalar core including a plurality of fetch engines 220, a plurality of decode engines 230, and a plurality of execution engines 240. In this case, the core 200 may issue a plurality of instructions every clock cycle.

In FIGS. 1 and 2, components related to the description of certain examples are illustrated. Accordingly, those of ordinary skill in the art to which the present disclosure pertains will be able to recognize that other general-purpose components may be further included in addition to the components illustrated in FIGS. 1 and 2. For example, the multi-threading system 10 may further include one or more auxiliary memory devices (e.g., SSDs, HDDs), communication interfaces, additional caches at different levels, etc. and in the core 200, engines and memory configurations may be added or omitted, or two or more engines may be integrated.

Figure 3:
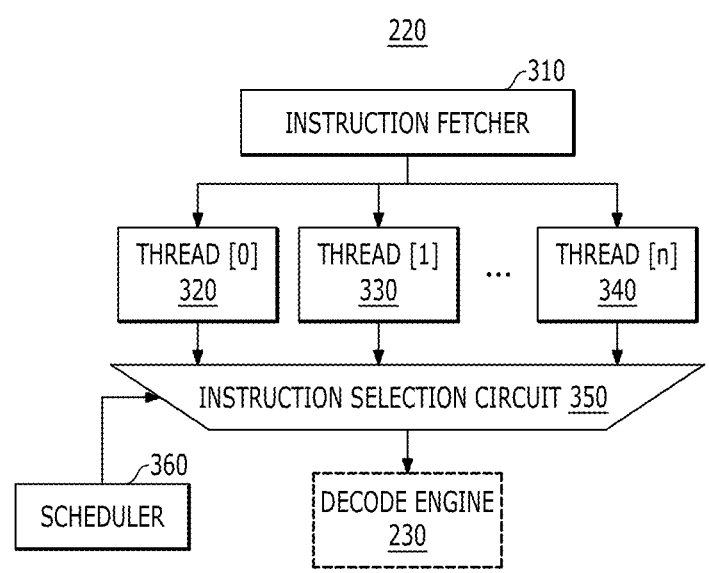
FIG. 3 is a block diagram illustrating a configuration of a fetch engine.

FIG. 3 is a block diagram illustrating a configuration of the fetch engine 220.

The fetch engine 220 may include an instruction fetcher 310, a plurality of thread buffers 320, 330, and 340, an instruction selection circuit 350, and a scheduler 360. The instruction fetcher 310 may fetch an instruction from the instruction cache 210 and provide it to each of the plurality of thread buffers 320, 330, and 340. Each of a plurality of threads has a corresponding thread buffer 320, 330, and 340.

Each of the plurality of thread buffers 320, 330, and 340 provides the instruction by the instruction selection circuit 350. In each clock cycle, the instruction selection circuit 350 selects one of the instructions as a selected instruction for provision to the decode engine 230 and the execution engine 240. The instruction selection circuit 350 may be configured to select the instruction in response to a control signal provided for each thread by the scheduler 360.

In the core 200, thread switching may be performed by switching a program counter value between a plurality of threads and executing the instruction of the corresponding thread. The thread switching may be managed by the scheduler 360, and one thread may be temporarily suspended and the other thread may be executed.

The multi-threading processor 100 may execute the threads in parallel according to a scheduling policy describing fetch and dispatch for the instructions of a plurality of threads. The multi-threading processor 100 may schedule dispatches of instructions from a plurality of threads in various ways. The multi-threading processor 100 allows a plurality of threads to share the functional units of the core 200 in a parallel manner.

Any one (e.g., thread 0) of a plurality of threads may be stalled when it encounters a long latency. In addition, other threads (e.g., threads 1 to n) may also be stalled by the long latency. In this way, in a certain situation, the long latency may cause all of the plurality of threads to be stalled by the data hazard such as long latency. In this case, all pipeline operations after the fetch operation are also stalled. The operation of the plurality of threads may be stalled until the data hazard is resolved. If all operations of a plurality of threads are stalled from when the data hazard occurs to when it is resolved, a large performance loss may occur for the multi-threading processor.

In order to reduce such performance loss, in a situation in which the data hazard is occurred, the multi-threading processor 100 initiates the operation of a specific thread at a specific time point even before the data hazard is resolved. For this purpose, hint information may be used, and this will be described below.

Figure 4:
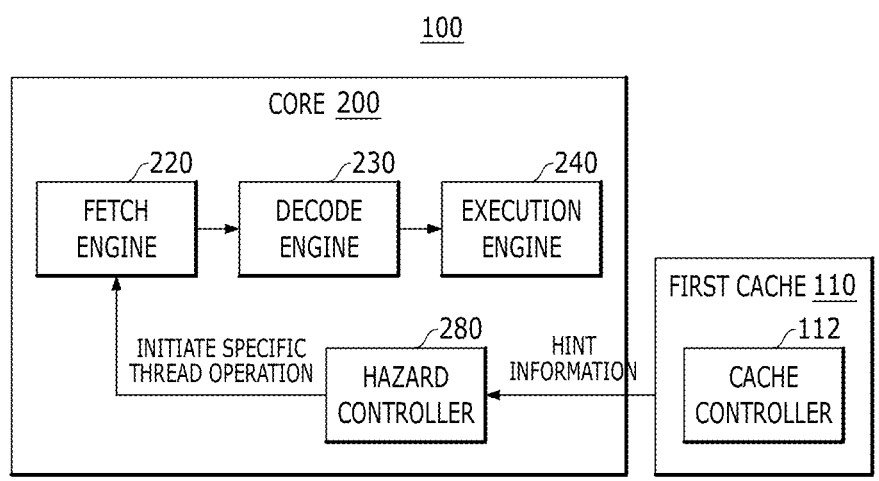
FIG. 4 is a diagram illustrating a process of processing hint information in a multi-threading processor.

FIG. 4 is a diagram illustrating a process of processing hint information in the multi-threading processor 100.

The core 200 may determine the occurrence of data hazard for a plurality of threads (e.g., all threads). Data hazard may occur when a plurality of threads attempt to simultaneously access or change the same data in the fetch stage. As an example, in a multi-threaded program, data hazard may occur when a plurality of threads access the same shared variable. As another example, prediction failure may occur when a plurality of threads have to follow different branch paths. In this case, in the fetch stage, a plurality of threads fetch different instructions, which may result in data hazard.

The data hazards may mainly occur when data is imported from outside the core 200 (e.g., from the second cache 120, the main memory 130), such as a Read After Write (RAW) hazard, a Write After Read (WAR) hazard, and a Write After Write (WAW) hazard. If data is imported from the second cache 120 outside the core 200, it may take at least 10 to 20 clock cycles on the pipeline, for example. Even if data is imported from the first cache 110 inside the core 200, it may take at least 4 to 5 clock cycles on the pipeline, for example. The data hazard may occur in all of a plurality of threads in a long latency situation, but aspects are not limited thereto. The core 200 may stall the operation of a plurality of threads in the data hazard situation. For example, the hazard controller 280 (or hazard checker) provided in the core 200 may not allow a plurality of threads to operate until the data hazard is resolved.

The first cache 110, the second cache 120, or another cache may generate hint information instructing a specific thread of a plurality of threads to operate. Although the present disclosure illustrates that the first cache 110 generates hint information, aspects are not limited thereto. The hint information may be information indicating that the data hazard will be resolved. For example, the hint information may be information indicating that the data hazard will be resolved after a predetermined clock cycle (e.g., after two clock cycles).

The core 200 may transfer a data access request including address information to the first cache 110. Based on the address information, a cache controller 112 of the first cache 110 may search for a cache tag and determine whether data corresponding to the address information is stored in the memory of the first cache 110. If determining that the data corresponding to the address information is stored in the memory of the first cache 110 (i.e., cache hit), the cache controller 112 may transfer the hint information to the core 200. The time point at which the cache controller 112 transfers the data corresponding to the address information may be after the time point at which the hint information is transferred.

The cache controller 112 may transfer data corresponding to the address information to the core 200 in a specific clock cycle, and transfer the hint information to the core 200 before (e.g., 2 to 3 clock cycles before) the specific clock cycle. The cache controller 112 may determine a time point of transferring the hint information based on an expected time point of transferring the data and a time required for the fetch operation and/or decode operation of the specific thread. For example, if the expected time of transferring data is 10 clock cycles later, and 2 clock cycles are required for the fetch and decode operations of the specific thread, the cache controller 112 may determine to transfer the hint information to the core 200 after 8 clock cycles. In this regard, the time point of transferring the hint information may be defined by a prior agreement between the cache and the core 200 or may be designed according to the specifications of the cache and the core 200.

The data access request may include information on the specific thread, and the hint information may include information on the specific thread. For example, the hint information may include n bits including information on the specific thread and information on the presence or absence of a hint.

Based on the hint information received from the first cache 110, the core 200 may initiate an operation of the specific thread while the data hazard for the plurality of threads is maintained. In this case, the operation may not be initiated for the threads other than the specific thread of a plurality of threads. In response to receiving the hint information, the core 200 may cause the specific thread to initiate the fetch operation using the fetch engine 220. The core 200 may cause the specific thread to sequentially perform the fetch operation and the decode operation using the fetch engine 220 and the decode engine 230. After the specific thread initiates operation, the core 200 may determine whether to resolve the data hazard.

According to various examples of the present disclosure, the core 200 may cause the specific thread to perform at least part of the fetch operation and the decode operation between the time of receiving the hint information and the time of resolving the data hazard. The hint information may be received in the n-th clock cycle, and the data hazard may be resolved in the m-th clock cycle. The core 200 may cause the specific thread to initiate the fetch operation in any one of the (m−1)th to (n+1)th clock cycles. Alternatively, the core 200 may cause the specific thread to perform the fetch operation and the decode operation from the (m−1)th clock cycle to the (n+1)th clock cycle.

The core 200 may receive the hint information in the n-th clock cycle and resolve the data hazard in the (n+3)th clock cycle. In this case, the core 200 may cause the specific thread to initiate the fetch operation in the (n+1)th clock cycle, and cause the specific thread to initiate the decode operation in the (n+2)th clock cycle. In addition, the core 200 may cause the specific thread to initiate the execution operation using the execution engine 240 in the (n+3)th clock cycle, that is, at a time point of resolving the data hazard. In this case, the core 200 may cause the specific thread to initiate the execution operation according to the time point at which the data hazard is resolved.

The core 200 may receive the hint information in the n-th clock cycle and resolve the data hazard in the (n+2)th clock cycle. In this case, the core 200 may cause the specific thread to initiate the fetch operation in the (n+1)th clock cycle. In addition, the core 200 may cause the specific thread to initiate the decode operation in the (n+2)th clock cycle, that is, at a time point of resolving the data hazard.

The core 200 may receive the hint information in the n-th clock cycle and resolve the data hazard in the (n+4)th clock cycle. In this case, the core 200 may cause the specific thread to initiate the fetch operation in the (n+2)th clock cycle, and cause the specific thread to initiate the decode operation in the (n+3)th clock cycle. In addition, the core 200 may cause the specific thread to initiate the execution operation using the execution engine 240 in the (n+4)th clock cycle, that is, at a time point of resolving the data hazard. In this case, the core 200 may cause the specific thread to initiate the execution operation according to the time point at which the data hazard is resolved. In addition, according to various examples, a time point of receiving the hint information, a time point of operating the specific thread, a time point of resolving the data hazard, etc. may be determined.

The multi-threading system 10 may include a signal line for connecting the core 200 and the first cache 110. The first cache 110 may transfer the hint information through the signal line. The core 200 may include the hazard controller 280 configured to receive the hint information and initiate the operation of the specific thread. In addition, the hazard controller 280 may control the data hazard state for a plurality of threads. For example, the hazard controller 280 may resolve the data hazard for the plurality of threads in response to receiving the data from the first cache 110.

Although FIG. 4 illustrates the hazard controller 280 as a separate configuration of the core 200, it may also be integrated into the other configurations of the core 200. In addition, although the first cache 110 is illustrated as a memory in FIG. 4, aspects are not limited thereto, and another layer of cache such as the second cache 120, etc., or a main memory 130, or another memory device may serve as the first cache 110.

Figure 5:
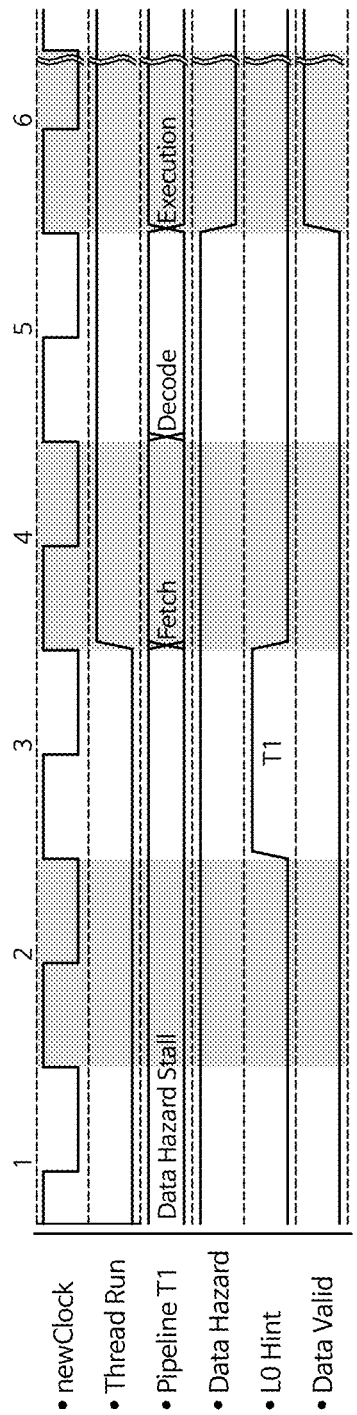
FIG. 5 is a diagram illustrating a core operation according to time when hint information is used.

FIG. 5 is a diagram illustrating an operation of the core 200 according to time when the hint information is used.

The core 200 determines the occurrence of data hazard for a plurality of threads in the first clock cycle and stalls the operation of the plurality of threads. The data hazard state is maintained until the core 200 determines that the data is valid in the sixth clock cycle. In the sixth clock cycle, the core 200 determines that the data is valid and resolves the data hazard.

The core 200 receives the hint information in the third clock cycle from the cache (e.g., the first cache 110). The hint information may include information on the specific thread T1. The core 200 may receive the hint information and initiate the operation of the specific thread T1 in the next clock cycle, that is, in the fourth clock cycle. The core 200 may cause the specific thread T1 to perform the fetch operation in the fourth clock cycle. In addition, the core 200 may cause the specific thread T1 to perform the decode operation in the fifth clock cycle, which is a clock cycle that follows after the fetch operation is complete. In addition, the core 200 may cause the specific thread T1 to perform the execution operation in the sixth clock cycle, which is the clock cycle that follows after the decode operation is complete.

Figure 6:
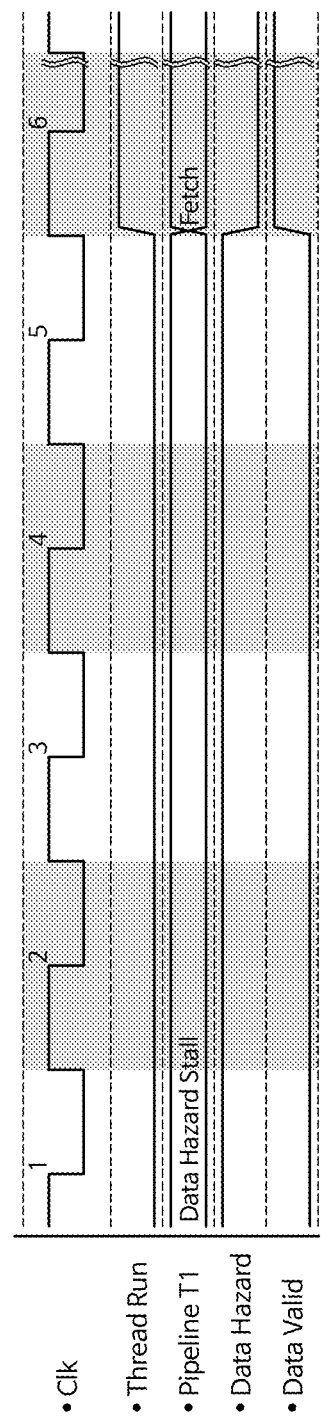
FIG. 6 is a diagram illustrating a core operation according to time when hint information is not used in the multi-threading processor according to a comparative example.

FIG. 6 is a diagram illustrating a core operation when the hint information is not used in the multi-threading processor according to the comparative example.

FIG. 6 shows a comparative example in which the hint information is not used for comparison with the example shown in FIG. 5. In this case, the core determines that the data is valid and initiates the operation of the thread in the sixth clock cycle of resolving the data hazard. The core causes the specific thread to perform the fetch operation in the sixth clock cycle. The core may cause the specific thread to perform the decode operation and the execution operation in the seventh and eighth clock cycles.

Referring back to FIG. 5, the core 200 causes the specific thread to perform the execution operation in accordance with the time point at which the data hazard is resolved. In other words, before the data hazard is resolved, the core 200 causes the specific thread to perform the fetch operation and the decode operation in advance. Accordingly, the core 200 may obtain a performance gain by two clock cycles compared to the core according to the comparative example. In other words, instead of stalling the operation of the thread for 5 clock cycles due to the data hazard situation, the multi-threading processor 100 may stall the operation for only 3 clock cycles. That is, it may be considered that the performance improvement is achieved by 40%.

Figure 7:
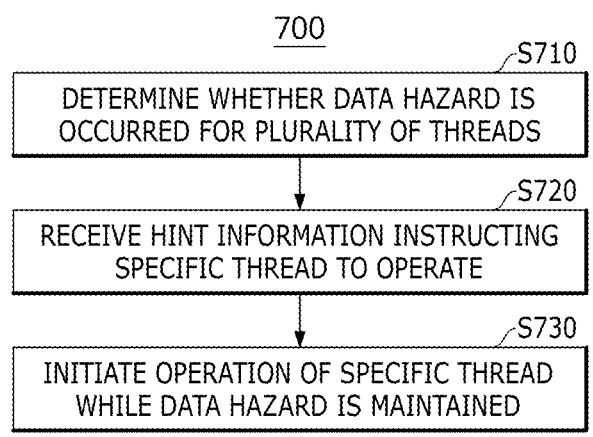
FIG. 7 is a flowchart illustrating an operating method of a multi-threading processor.

FIG. 7 is a flowchart illustrating an operating method of the multi-threading processor 100.

The multi-threading processor 100 determines whether the data hazard is occurred for a plurality of threads, at S710. The core 200 may determine the occurrence of the data hazard for all of the plurality of threads, and stall the operation for all of the plurality of threads.

The multi-threading processor 100 determines whether the data hazard is occurred for a plurality of threads, at S720. The core 200 may receive, from the cache, the hint information instructing the specific thread of a plurality of threads to operate. The hint information may be generated by a cache (e.g., the first cache 110 or the second cache 120) and transferred to the core 200 through a separate signal line.

The multi-threading processor 100 initiates the operation of the specific thread while the data hazard is maintained, at S730. The core 200 initiates the operation of the specific thread while the data hazard for a plurality of threads is maintained. For example, the core 200 may cause the specific thread to perform the fetch operation and/or the decode operation. The core 200 may resolve the data hazard and cause the specific thread to perform the execution operation.

The methods in accordance with the present disclosure may be computer-implemented methods. Although each step of the corresponding methods has been shown and described in a given order in the present disclosure, the respective steps may also be performed in an order that can be combined arbitrarily according to the present disclosure, in addition to being performed in sequence. In one embodiment, at least some of the steps may be performed in parallel, iteratively, or heuristically. The present disclosure does not exclude making changes or modifications to the methods. In one embodiment, at least some of the steps may be omitted or other steps may be added.

Various embodiments of the present disclosure may be implemented as software recorded on a machine-readable recording medium. The software may be software for implementing the various embodiments of the present disclosure described above. Software may be inferred from the various embodiments of the present disclosure by programmers skilled in the art to which the present disclosure pertains. For example, the software may be machine-readable commands (e.g., code or code segments) or programs. A machine is a device capable of operating according to instructions called from a recording medium, and may be, for example, a computer. In one embodiment, the machine may be the multiprocessor system 100, a component thereof, or a combination of components thereof in accordance with the embodiments of the present disclosure. In one embodiment, the processor of the machine may execute the called command and cause the components of the machine to perform functions corresponding to the command. The recording medium may refer to any type of recording medium on which data readable by a machine are stored. The recording medium may include, for example, ROM, RAM, CD-ROM, magnetic tapes, floppy disks, optical data storage devices, and the like. In one embodiment, the recording medium may be implemented in a distributed form over networked computer systems or the like. The software may be stored in a distributed manner and executed on a computer system or the like. The recording medium may be a non-transitory recording medium. A non-transitory recording medium refers to a tangible medium regardless of whether data is stored in it semi-permanently or temporarily, and does not include signals propagating in a transitory manner.

Although the technical idea of the present disclosure has been described by various embodiments above, the technical idea of the present disclosure includes various substitutions, modifications, and changes that can be made within the scope that can be understood by those skilled in the art to which the present disclosure pertains. Further, it is to be understood that such substitutions, modifications, and changes may fall within the scope of the appended claims. The embodiments in accordance with the present disclosure may be combined with each other. The respective embodiments may be combined in various ways according to the number of cases, and the combined embodiments also fall within the scope of the present disclosure.

The invention claimed is:

1. A multi-threading processor comprising:
a cache including a memory and a controller; and
a core electrically connected to the cache and configured to simultaneously execute and manage a plurality of threads,
wherein the core is configured to:
determine an occurrence of a data hazard for the plurality of threads and stall operations of the plurality of threads;
receive, from the cache, hint information instructing a first thread of the plurality of threads to operate; and
initiate an operation of the first thread based on the hint information while the data hazard for the plurality of threads is maintained,
wherein the core transfers a data access request including address information to the cache, and
wherein the controller of the cache is configured to:
search a cache tag based on the address information to determine whether data corresponding to the address information is stored in the memory; and
transfer the hint information to the core in response to determining that the data corresponding to the address information is stored in the memory.

2. The multi-threading processor according to claim 1, wherein the core is further configured to:
receive the hint information in n-th clock cycle; and
cause the first thread to initiate a fetch operation in (n+1)th clock cycle.

3. The multi-threading processor according to claim 1, wherein the core is further configured to:
receive the hint information in n-th clock cycle;
resolve the data hazard in m-th clock cycle; and
cause the first thread to initiate a fetch operation in any one of (n+1)th clock cycle to (m−1)th clock cycle.

4. The multi-threading processor according to claim 1, wherein the core is further configured to:
receive the hint information in n-th clock cycle;
resolve the data hazard in m-th clock cycle;
cause the first thread to perform a fetch operation and a decode operation from (n+1)th clock cycle to (m−1)th clock cycle; and
cause the first thread to perform an execution operation in the m-th clock cycle.

5. The multi-threading processor according to claim 1, wherein the controller of the cache is further configured to:
transfer data corresponding to the address information to the core in m-th clock cycle; and
transfer the hint information to the core a predetermined clock cycle before the m-th clock cycle.

6. The multi-threading processor according to claim 1, wherein the data access request includes information on the first thread, and
the hint information includes information on the first thread.

7. The multi-threading processor according to claim 1, wherein the core includes a hazard controller configured to receive the hint information and initiate the operation of the first thread, and
wherein the hazard controller receives the hint information through a signal line connecting the core and the cache.

8. The multi-threading processor according to claim 1, wherein the core is further configured to determine a resolution of the data hazard after initiating the operation of the first thread.

9. The multi-threading processor according to claim 1, wherein the core is a multi-threading scalar core.

10. The multi-threading processor according to claim 1, wherein the core is further configured to determine that the data hazard is occurred when the plurality of threads access a shared variable or bring different instructions.

11. An operating method of a multi-threading processor comprising a cache including a memory and a controller, and a core electrically connected to the cache and configured to simultaneously execute and manage a plurality of threads, the method comprising:
- determining, by the core, an occurrence of a data hazard for the plurality of threads and stalling operations of the plurality of threads;
- receiving from the cache, by the core, hint information instructing a first thread of the plurality of threads to operate; and
- initiating, by the core, an operation of the first thread based on the hint information while the data hazard for the plurality of threads is maintained,
- wherein the receiving the hint information includes:
  - transferring, by the core, a data access request including address information to the cache; and
  - searching, by the controller of the cache, a cache tag based on the address information to determine whether data corresponding to the address information is stored in the memory, and transferring the hint information to the core in response to determining that the data corresponding to the address information is stored in the memory.

12. The method according to claim 11, wherein the receiving the hint information includes receiving the hint information in n-th clock cycle, and
- wherein the initiating the operation of the first thread includes causing the first thread to initiate a fetch operation in (n+1)th clock cycle.

13. The method according to claim 11, further comprising resolving the data hazard in m-th clock cycle,
- wherein the receiving the hint information includes receiving the hint information in n-th clock cycle, and
- the initiating the operation of the first thread includes causing the first thread to initiate a fetch operation in any one of (n+1)th clock cycle to (m−1)th clock cycle.

14. The method according to claim 11, further comprising resolving the data hazard and performing, by the first thread, an execution operation in m-th clock cycle,
- wherein the receiving the hint information includes receiving the hint information in n-th clock cycle, and
- wherein the initiating the operation of the first thread includes causing the first thread to perform a fetch operation and a decode operation from (n+1)th clock cycle to (m−1)th clock cycle.

* * * * *